(12) United States Patent
Sun et al.

(10) Patent No.: US 7,720,283 B2
(45) Date of Patent: May 18, 2010

(54) BACKGROUND REMOVAL IN A LIVE VIDEO

(75) Inventors: Jian Sun, Beijing (CN); Heung-Yeung Shum, Beijing (CN); Xiaoou Tang, Beijing (CN); Weiwei Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 929 days.

(21) Appl. No.: 11/469,371

(22) Filed: Aug. 31, 2006

(65) Prior Publication Data

US 2007/0133880 A1 Jun. 14, 2007

Related U.S. Application Data

(60) Provisional application No. 60/743,024, filed on Dec. 9, 2005.

(51) Int. Cl.
*G06K 9/34* (2006.01)
(52) U.S. Cl. .................................... 382/173
(58) Field of Classification Search ............... 382/173, 382/176, 218–222, 254, 270, 274; 358/3.27, 358/464–466; 348/251, 603, 619
See application file for complete search history.

(56) References Cited

U.S. PATENT DOCUMENTS

| | | | | |
|---|---|---|---|---|
| 6,061,476 A | * | 5/2000 | Nichani | 382/270 |
| 6,400,831 B2 | | 6/2002 | Lee et al. | |
| 6,760,484 B1 | * | 7/2004 | Sobol | 382/254 |
| 6,819,796 B2 | * | 11/2004 | Hong et al. | 382/173 |
| 6,909,747 B2 | | 6/2005 | Bordes et al. | |
| 7,085,401 B2 | * | 8/2006 | Averbuch et al. | 382/103 |
| 2003/0174773 A1 | | 9/2003 | Comaniciu et al. | |

FOREIGN PATENT DOCUMENTS

KR  20040068432 A  7/2004

OTHER PUBLICATIONS

Bahl, et al., "SSCH: Slotted Seeded Chanel Hopping for Capacity Improvement in IEEE 802.11 Ad-Hoc Wireless Networks", ACM, 2004, pp. 1-15.
Chang, et al., "Dynamic Channel Assignment and Reassignment for Exploiting Channel Reuse Opportunities in Ad Hoc Wireless Networks", vol. E86-B, No. 4, 2003, pp. 1234-1246.
Elson, et al., "Fine-Grained Network Time Synchronization using Reference Broadcasts", USENIX Association, pp. 147-163, 2002.
Mo, et al., "Comparison of Multi-Channel MAC Protocols", ACM, 2005, pp. 1-10, 2007.

(Continued)

*Primary Examiner*—Jose L Couso
(74) *Attorney, Agent, or Firm*—Lee & Hayes, PLLC (57) ABSTRACT

Exemplary systems and methods segment a foreground from a background image in a video sequence. In one implementation, a system refines a segmentation boundary between the foreground and the background image by attenuating background contrast while preserving contrast of the segmentation boundary itself, providing an accurate background cut of live video in real time. A substitute background may then be merged with the segmented foreground within the live video. The system can apply an adaptive background color mixture model to improve segmentation of foreground from background under various background changes, such as camera movement, illumination change, and movement of small objects in the background.

20 Claims, 10 Drawing Sheets

OTHER PUBLICATIONS

Ramani, et al., "SyncScan: Practical Fast Handoff for 802.11 Infrastructure Networks", pp. 1-10, 2002.

Raniwala, et al., "Architecture and Algorithms for an IEEE 802.11—Based Multi-Channel Wireless Mesh Network", pp. 1-12, 2005.

Raniwala, et al., "Centralized Channel Assignment and Routing Algorithms for Multi-Channel Wireless Mesh Networks", pp. 50-65, 2005.

So, et al., "A Routing Protocol for Utilizing Multiple Channels in Multi-Hop Wireless Networks with a Single Transceiver", pp. 1-10, 2004.

So, et al., "Multi-Channel MAC for Ad Hoc Networks: Handling Multi-Channel Hidden Terminals Using A Single Transceiver", ACM, 2004, pp. 1-12.

So, et al., "Practical Synchronization Techniques for Multi-Channel MAC", ACM, 2006, pp. 134-145.

Vedantham, et a;., "Component Based Channel Assignment in Single Radio, Multi-Channel Ad Hoc Networks", ACM, 2006, pp. 378-389.

Wu, et al., "A New Multi-Channel MAC Protocol with On-Demand Channel Assignment for Multi-Hop Mobile Ad Hoc Networks", pp. 1-22, 2000.

Wu, et al., "SoftMAC: Layer 2.5 MAC for VoIP Support in Multi-hop Wireless Networks", pp. 1-11, 2002.

\* cited by examiner

BACKGROUND REMOVAL IN A LIVE VIDEO

RELATED APPLICATIONS

This application claims priority to U.S. Provisional Patent Application No. 60/743,024 to Sun et al., entitled "Background Cut," filed on Dec. 9, 2005, and incorporated herein by reference.

BACKGROUND

Layer extraction has long been a research topic in the art of computer vision. Recent work has shown that the foreground layer can be accurately and efficiently extracted (i.e., in near real time) from a binocular stereo video, for example, in a teleconferencing scenario. In one application, such foreground layer extraction is used to perform high quality live background substitution. The success of the binocular approach arises from a probabilistic fusion of multiple cues, i.e., stereo, color, and contrast cues.

In most real-world visual communication scenarios, however, e.g., teleconferencing or instant messaging, most users have only a single web camera in operation. What is needed is quality foreground layer extraction using such a single web camera. For a typical scene (e.g., with a non-static "moving" background) automatic foreground layer extraction is still a monumental challenge in the current state of the art. But in a special case, in which the background is known and stationary, it would be useful to obtain high quality, real-time foreground extraction (or background removal) from a single camera.

To address this problem, the most efficient approach is background subtraction. Background subtraction detects foreground objects as the difference between the current image a pre-existing, known background image. However, there are still complex issues in such background subtraction: first, the threshold in background subtraction is very sensitive to noise and background illuminance changes. A larger threshold detects fewer foreground pixels and vice versa. Second, foreground color and background color may by chance be very similar, resulting in holes in the detected foreground object. More sophisticated techniques have been proposed to overcome these problems. But results are still error-prone and not accurate enough for high quality live foreground extraction.

Recent interactive image and video segmentation techniques have shown the powerful effectiveness of a color/contrast-based model. Color/contrast-based models consider both color similarity to manually obtained foreground/background color models and contrast (or edge) strength along the segmentation boundary. The final foreground layer is globally determined using a min-cut algorithm. But background subtraction even using color and contrast cues is still insufficient for correct foreground extraction.

A straightforward improvement is to combine the two techniques above—building foreground and background color models from background subtraction and then applying the above color/contrast based model. Because the background image is already known and stationary, the background color model can be modeled as a mixture of a global color model and a more accurate per-pixel color model. This combination can produce a more accurate segmentation result, and is referred to herein as the (conventional) "basic model."

However, there are still problems in the basic model. Since the basic model considers both color and contrast simultaneously, the final segmentation boundary is inevitably "snapped" or attracted to high contrast edges in a cluttered background. Though this kind of error may be small around the boundary or occur only in partial frames, the flickering artifact in the running video due to this error can be very distracting and unpleasant in the final composite video.

SUMMARY

Exemplary systems and methods segment a foreground from a background image in a video sequence. In one implementation, a system refines a segmentation boundary between the foreground and the background image by attenuating background contrast while preserving contrast of the segmentation boundary itself, providing an accurate background cut of live video in real time. A substitute background may then be merged with the segmented foreground within the live video. The system can apply an adaptive background color mixture model to improve segmentation of foreground from background under various background changes, such as camera movement, illumination change, and movement of small objects in the background.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

This disclosure describes automatic separation of foreground from background in a live video. Exemplary systems and methods have higher background cut accuracy than conventional techniques. An exemplary system performs a high quality, real-time separation of foreground and background visual layers from a live video. Then, in a typical application, the foreground can be placed in a different background setting via background substitution.

In one implementation, the exemplary system applies a layer extraction method sometimes referred to herein as "background cut." In a video sequence with a moving foreground object and a stationary background, the background cut method uses an exemplary background contrast attenuation method to significantly reduce segmentation errors caused by high contrast edges in the background clutter. The exemplary background cut method thus combines background subtraction, color cues, and contrast cues to extract the foreground layer accurately and efficiently. In the exemplary background cut method, background subtraction is not only based on image color but also on image contrast—that has been attenuated in the background—for greater accuracy in determining segmentation borders.

Importantly, the background contrast attenuation just introduced adaptively attenuates contrasts in the background while preserving the contrasts that are present across foreground/background boundaries. The exemplary background contrast attenuation exploits the fact that the kind of contrast (or more precisely, color image gradient) in the background is dissimilar to the kind of contrast that exists across foreground/background boundaries, in most cases. Thus, using the exemplary background cut, layer extraction errors that are caused by background clutter can be substantially reduced. Exemplary systems are also robust to various background artifacts and changes that occur in real applications.

Additionally, this disclosure describes exemplary methods of background maintenance that support the accurate and efficient background cut method. In various implementations, an adaptive mixture model of global and per-pixel background colors improves the robustness of the exemplary systems and methods when the video is subjected to various background changes.

In one implementation, an exemplary system aims to achieve high quality foreground layer extraction using a single web camera. Thus, one implementation of the exemplary system addresses a somewhat constrained but widely useful real-world problem: high quality, real-time foreground extraction (or background removal) from a single camera when there is a known, stationary background.

Exemplary Environment

Figure 1:
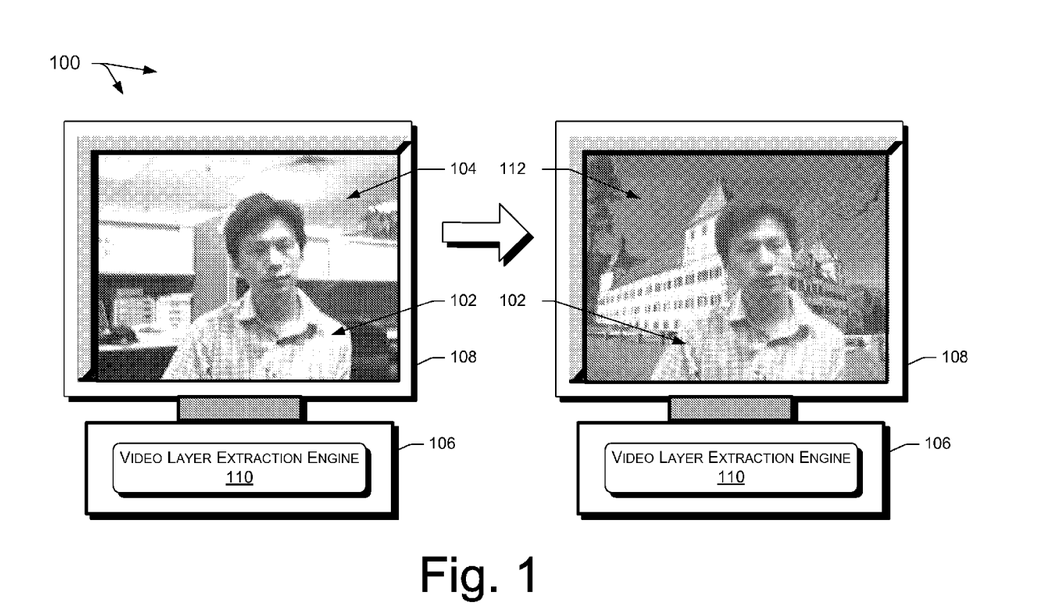
FIG. 1 is a diagram of an exemplary system for performing background removal in a live video.

FIG. 1 shows a computing environment 100 in which an exemplary system automatically separates a foreground video object or layer 102 from a background layer 104. A computing device 106 is connected to a display 108 and hosts an exemplary video layer extraction engine 110. By performing adaptive background contrast attenuation as part of exemplary layer extraction, the video layer extraction engine 110 accurately segments the foreground layer 102 from the background layer 104 in real time. Then optionally, in one implementation, the video layer extraction engine 110 substitutes a new background layer 112 for the original background layer 104.

The Basic Model

The "basic model," introduced above, provides a basic video layer extraction framework for the exemplary engine to be described further below, although the exemplary engine possesses components and functions that the basic model does not include. That is, in one implementation, the video layer extraction engine 110 builds on concepts used in the basic model. Thus, the basic model will now be described as a foundation for describing the exemplary engine further below.

In one implementation, let $I^B$ be the known background image and I be the image at the current timestep that is to be processed. $I^B_r$ and $I_r$ are color values of pixel r in $I^B$ and I respectively. Let V be the set of all pixels in I and $\epsilon$ be the set of all adjacent pixel pairs (4 neighbors or 8 neighbors) in I. Foreground/background segmentation can be posed as a binary labeling problem—to assign a unique label $x_r$ to each pixel $r \in V$, i.e., $x_r \in \{\text{foreground}(=1), \text{background}(=0)\}$. The labeling variables $X=\{x_r\}$ can be obtained by minimizing a Gibbs energy $E(X)$ as in Equation (1):

$$E(X) = \sum_{r \in \upsilon} E_1(x_r) + \lambda \sum_{(r,s) \in \varepsilon} E_2(x_r, x_s), \qquad (1)$$

where $E_1(x_r)$ is the color term, encoding the cost when the label of pixel r is $x_r$, and $E_2(x_r, x_s)$ is the contrast term, denoting the cost when the labels of adjacent nodes r and s are $x_r$ and $x_s$ respectively. The parameter $\lambda$ balances the influences of the two terms.

Color Term of the Basic Model

To model the likelihood of each pixel r belonging to foreground or background, a foreground color model $p(I_r|x=1)$ and a background color model $p(I_r|x=0)$ are learned from samples. Both models are represented by spatially global Gaussian mixture models (GMMs).

The global background color model $p(I_r|x=0)$ can be directly learned from the known background image $I^B$ as in Equation (2):

$$p(I_r | x = 0) = \sum_{k=1}^{K} w_k^b N\left(I_r | \mu_k^b, \sum_k^b\right), \qquad (2)$$

where $N(\cdot)$ is a Gaussian distribution and $(w_k^b, \mu_k^b, \Sigma_k^b)$ represents the weight, the mean color, and the covariance matrix of the kth component of the background GMMs. The typical value of K is 15 for the background. For stationary background, a per-pixel single isotopic Gaussian distribution $p_B(I_r)$ is also used to model the background color more precisely as in Equation (3):

$$p_B(I_r) = N(I_r | \mu_r^B, \Sigma_r^B), \qquad (3)$$

where $\mu_r^B = I_r^B$ and $\Sigma_r^B = \sigma_r^2 I$. The per-pixel variance $\sigma_r^2$ is learned from a background initialization phase. The per-pixel color model is more precise than the global color model but is sensitive to noise, illuminance change, and small movement of background. The global background color model is less precise but more robust. Therefore, an improved approach is to mix the two models, as in Equation (4):

$$p_{mix}(I_r) = \alpha \cdot p(I_r|x=0) + (1-\alpha) \cdot p_B(x_r) \qquad (4)$$

where $\alpha$ is a mixing factor for the global and per-pixel background color models.

The global foreground color model is learned from background subtraction. With a per-pixel background color model, an exemplary system can mark the pixel that has a very low background probability as "definitely foreground." Let B, F, U represent "definitely background", "definitely foreground" and "uncertainty region" respectively, yielding in Equation (5):

$$I_r = \begin{cases} B & p_B(I_r) < t_b \\ F & p_B(I_r) > t_f \\ U & \text{otherwise} \end{cases} \quad (5)$$

where $t_b$ and $t_f$ are two thresholds. Then, the global foreground color model $p(I_r|x=1)$ is learned from the pixels in F. In order to enforce temporal coherence, the system also samples from the pixels from the intersection of F and the labeled foreground region (after segmentation) in the frame at the previous timestep. The component number K is set to 5 for the foreground because foreground colors are usually simpler than background colors.

Finally, the color term is defined as in Equation (6):

$$E_1(x_r) = \begin{cases} -\log p_{mix}(I_r) & x_r = 0 \\ -\log p(I_r|x_r=1) & x_r = 1 \end{cases} \quad (6)$$

Contrast Term of the Basic Model

For two adjacent pixels r and s, the contrast term $E_2(x_r, x_s)$ between them is defined as in Equation (7):

$$E_2(x_r, x_s) = |x_r - x_s| \cdot \exp(-\beta d_{rs}), \quad (7)$$

where $d_{rs=\|I_r-I_s\|^2}$ is the $L_2$ norm of the color difference, referred to as "contrast" herein. $\beta$ is a robust parameter that weights the color contrast, and can be set to $\beta = (2\langle\|I_r-I_s\|^2\rangle)^{-1}$, where $\langle \cdot \rangle$ is the expectation operator. The factor $|x_r-x_s|$ allows this term to capture the contrast information only along the segmentation boundary. In other words, the contrast term $E_2$ is the penalty term when adjacent pixels are assigned with different labels. The more similar the colors of the two adjacent pixels are, the larger contrast term $E_2$ is, and thus the less likely it is that the edge is on the foreground object boundary.

To minimize the energy E(X) in Equation (1), an implementation of a min-cut algorithm can be used.

Exemplary Engine

Figure 2:
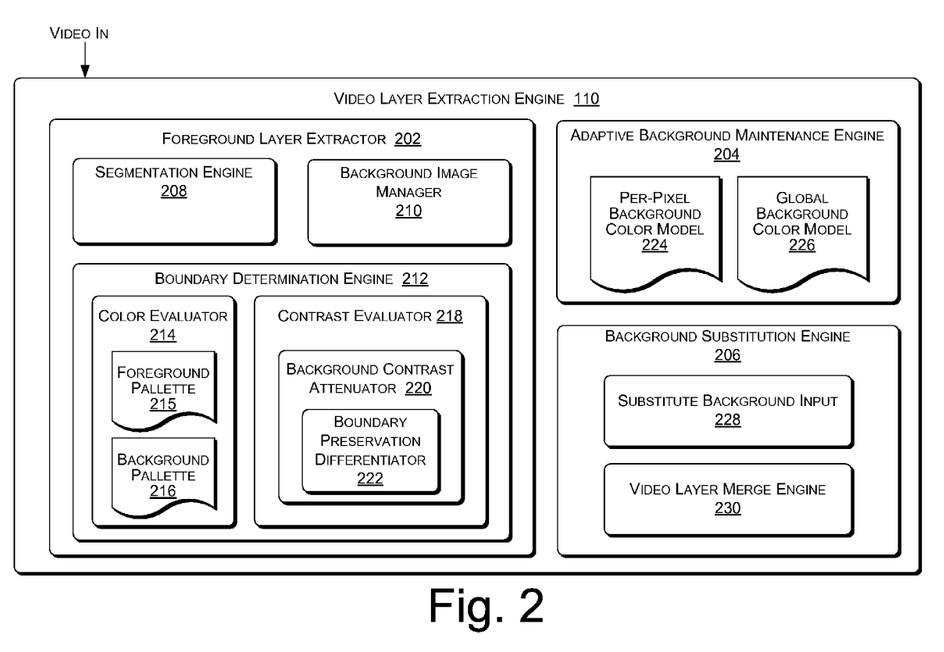
FIG. 2 is a block diagram of an exemplary video layer extraction engine.

FIG. 2 shows the exemplary video layer extraction engine 110 of FIG. 1 in greater detail. The exemplary engine 110 can perform according to the basic model presented above, but also possesses components and functionality beyond those of the basic model. The illustrated configuration of the exemplary video layer extraction engine 110 is only one implementation, and is meant to provide only one example arrangement for the sake of overview. Many other arrangements of the illustrated components, or similar components, are possible within the scope of the subject matter. Such an exemplary engine 110 can be executed in hardware, software; or combinations of hardware, software, firmware, etc.

In the illustrated configuration, the exemplary video layer extraction engine 110 includes a foreground layer extractor 202, an adaptive background maintenance engine 204, and a background substitution engine 206.

The foreground layer extractor 202 further includes a segmentation engine 208 to differentiate foreground from background for purposes of separating the two, e.g., by labeling foreground pixels with a different value than background pixels. The foreground layer extractor 202 also includes a background image manager 210 to keep track of an underlying stationary or "static" background layer. This assists in determining which pixels of an image to label in a default manner as background in view of boundary determination that establishes foreground. The foreground layer extractor 202 also includes a boundary determination engine 212 to delineate boundaries between foreground areas of the image and background areas of the image.

The boundary determination engine 212 further includes a color evaluator 214, which models foreground colors into a foreground palette 215 and models background colors into a background palette 216. The color evaluator 214 may then differentiate foreground pixels from background pixels based on their color attributes, thereby providing one type of cue for determining a boundary between foreground and background.

The boundary determination engine 212 further includes a contrast evaluator 218 to also differentiate foreground pixels (or pixel pairs) from background pixels based on their contrast attributes (i.e., their color image gradient). The contrast evaluator 218 provides a contrast cue for determining boundaries between foreground and background mainly by attenuating background contrast without disturbing boundary contrast. Thus, a background contrast attenuator 220 decreases contrast across pixel pairs constituting strong visual edges determined to be in the background while a boundary preservation differentiator 222 maintains contrast across pixel pairs comprising the visual border—the edge—between foreground and background. This can be achieved by using a large value for an attenuation parameter if pixel pairs are determined to be in the background and a small value for the attenuation parameter if the pixels are determined to be on the foreground/background boundary. With the background contrast attenuated by the background contrast attenuator 220 and the boundary contrast preserved by the boundary preservation differentiator 222, the contrast evaluator 218 provides strong and reliable contrast cues to the boundary determination engine 212, which are used with color cues from the color evaluator 214 for deciding where the segmentation border between foreground and background should be.

The adaptive background maintenance engine 204 introduced above further includes a per-pixel background color model 224 and a global background color model 226. Also, the background substitution engine 206 may further include a substitute background input 228 and a video layer merge engine 230.

The various components of the illustrated video layer extraction engine 110 are only one configuration for the sake of description. Other implementations of the exemplary video layer extraction engine 110 may have different components or a different arrangement of components.

Figure 3:
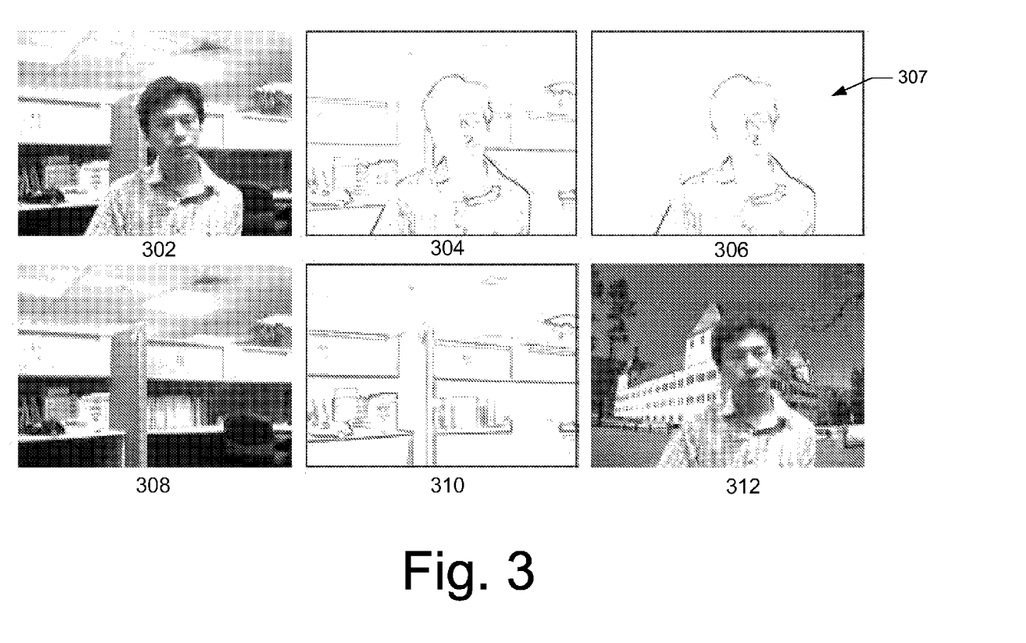
FIG. 3 is a diagram of exemplary background attenuation and background substitution.

FIG. 3 shows some elements used in describing the functioning of the exemplary video layer extraction engine 110. An image I 302 from a video sequence is the source of a corresponding contrast map 304. For display, the contrast for each pixel is computed as $\sqrt{d_{r,r_x} + d_{r,r_y}}$, where $r_x$ and $r_y$ are two adjacent pixels on the left and above pixel r. The exemplary video layer extraction engine 110 derives an attenuated contrast map 306, in which the background part 307 of the contrast map 306 has been attenuated. The background image $I^B$ 308 represents the image I 302 with its foreground layer extracted out. The background contrast map 310 can be used in the process of deriving the attenuated contrast map 306, above, in which the foreground remains unattenuated. Optionally, a new background may be used with the segmented foreground to produce a final foreground extraction result 312 with new background.

Operation of the Exemplary Engine

In the boundary determination engine 212 of FIG. 2 (the boundary being the demarcation between foreground and background), background contrast attenuation is based on a key observation that the contrast across (i.e., between, among) background pixels is dissimilar to the contrast across corresponding pixels on foreground/background boundaries. Referring to FIG. 3, frame 304 and frame 310 show contrast maps of the current image and the background image respectively. Most contrasts caused by foreground/background boundaries in contrast map 304 are not consistent with the contrasts in contrast map 310. Based on this observation, background contrast attenuation adaptively modifies the contrast map 304 to produce an attenuated contrast map 306. In contrast map 306 most contrasts from background are removed while contrasts caused by foreground/background boundaries are well preserved. Using this attenuated contrast map 306, the exemplary background cut method can extract a high quality foreground layer from a cluttered background as demonstrated in frame 312. The background image 308 also shows that segmentation errors can be significantly reduced in comparison to the basic model.

The "basic model" introduced in the above Background Section usually produces good layer extraction results in many frames of a video. However, when the scene contains background clutter, notable segmentation errors around the boundaries often occur. This generates flickering artifacts in video. Most incorrect segmentation boundaries pass along strong edges in the background. These errors are mainly caused by the contrast term in the basic model, shown in Equation (8):

$$E_2(x_r, x_s) = |x_r - x_s| \cdot \exp(-\beta \cdot d_{rs}). \tag{8}$$

The exemplary boundary determination engine 212 fixes this bias by removing or attenuating the contrasts in the background to obtain more accurate segmentation results.

Background Contrast Attenuation

In one possible implementation, because the "baseline" or substantially stationary background image (e.g., when no foreground is present) is known to the background manager 210, the segmentation engine 208 could apply a straightforward technique of subtracting the contrast of the background image $I^B$ 310 from the contrast of the current image I 304. To avoid hard thresholding, and prompted by the concept of anisotropic diffusion, the background contrast attenuator 220 could attenuate the contrast between two adjacent pixels (r, s) in image I from $d_{rs} = \|I_r - I_s\|^2$ to $d'_{rs}$ by the contrast $\|I_r^B - I_s^B\|^2$ in the background image:

$$d'_{rs} = \|I_r - I_s\|^2 \cdot \frac{1}{1 + \left(\frac{\|I_r^B - I_s^B\|}{K}\right)^2}, \tag{9}$$

where K is a constant to control the strength of attenuation. The larger the contrast $\|I_r^B - I_s^B\|^2$ is in the background, the more attenuation would be applied on the contrast $\|I_r - I_s\|^2$ in image I.

Figure 4:
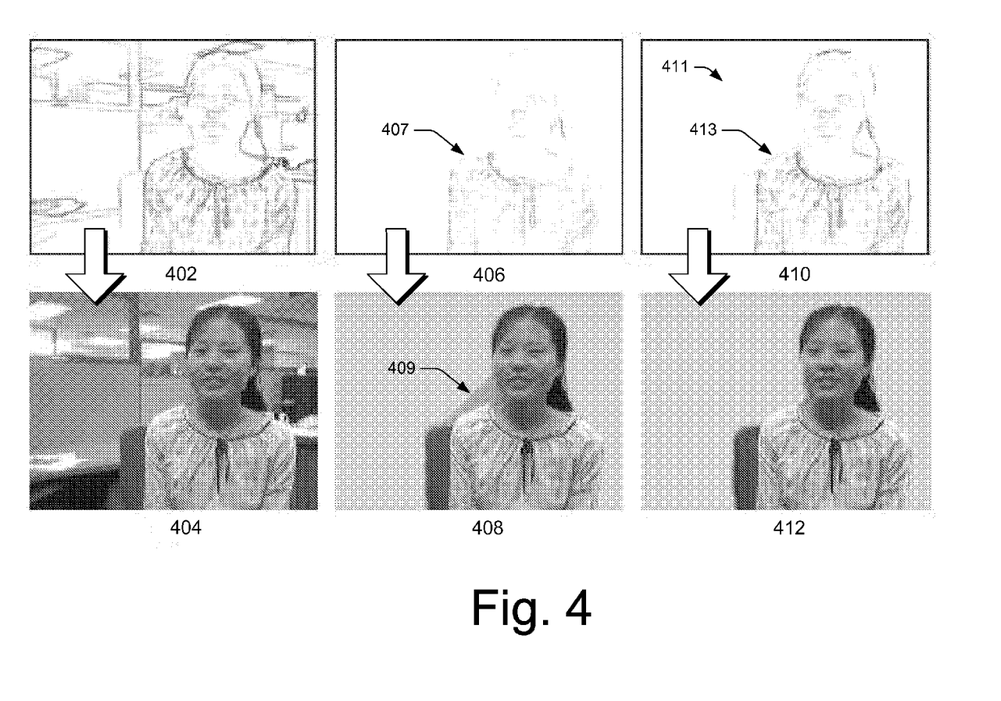
FIG. 4 is a diagram of exemplary background removal versus conventional background removal.

FIG. 4, however, shows contrast maps 402, 406, 410 and corresponding segmentation results 404, 408, 412, in which results from using the above straightforward technique are compared with improved results from the exemplary video layer extraction engine 110. Contrast map 402 and contrast map 406 show the contrast before and after the straightforward "soft" contrast subtraction described above. Unfortunately, the contrast caused by the foreground/background boundary 407 is also attenuated. The simple subtraction produces the unsatisfactory segmentation result 408, in which the foreground incorrectly includes part of the background 409.

Figure 5:
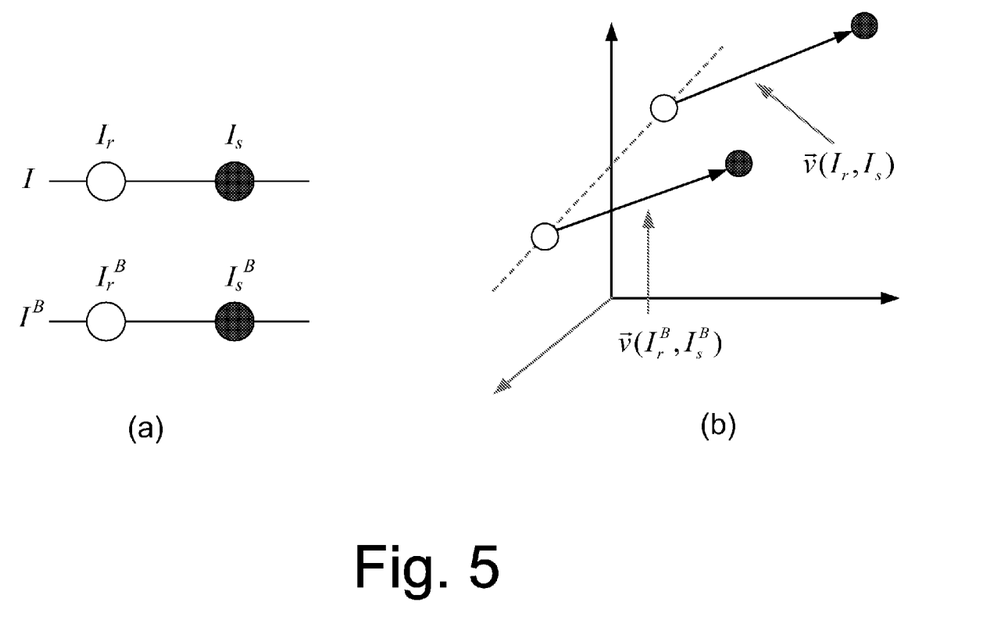
FIG. 5 is a diagram of exemplary comparison of contrast attributes of a pixel pair in a video frame and a corresponding pixel pair in a known background of the video frame.

Thus, in another implementation, the contrast evaluator 218 has a background contrast attenuator 220 that performs an exemplary adaptive background contrast attenuation method. The background contrast attenuator 220 can attenuate most contrasts in the background while the boundary preservation differentiator 222 simultaneously preserves contrasts along the foreground/background boundary. These may apply the exemplary technique given in Equation (10) to achieve the goal of adaptively performing background contrast attenuation while preserving foreground/background boundaries:

$$d''_{rs} = \|I_r - I_s\|^2 \cdot \frac{1}{1 + \left(\frac{\|I_r^B - I_s^B\|}{K}\right)^2 \exp\left(\frac{z_{rs}^2}{\sigma_z}\right)}, \tag{10}$$

where, as is shown in FIG. 5(a), $z_{rs}$ measures the dissimilarity between pixel pair $(I_r, I_s)$ in image I, and pixel pair $(I_r^B, I_s^B)$ in background image $I^B$. A Hausdorff distance-like definition for $z_{rs}$ is:

$$z_{rs} = \max\{\|I_r - I_r^B\|, \|I_s - I_s^B\|\}. \tag{11}$$

If $z_{rs}$ is small, the pixel pair $(I_r, I_s)$ has a high probability of belonging to the background, and the attenuation strength is set to large $(\exp(-Z_{rs}^2/\sigma_z) \to 1)$ by the background contrast attenuator 220. Otherwise, the pixel pair $(I_r, I_s)$ probably has the contrast caused by the foreground/background boundary, and the attenuation strength is set to small $(\exp(-Z_{rs}^2/\sigma_z) \to 0)$ by the boundary preservation differentiator 222.

Figure 6:
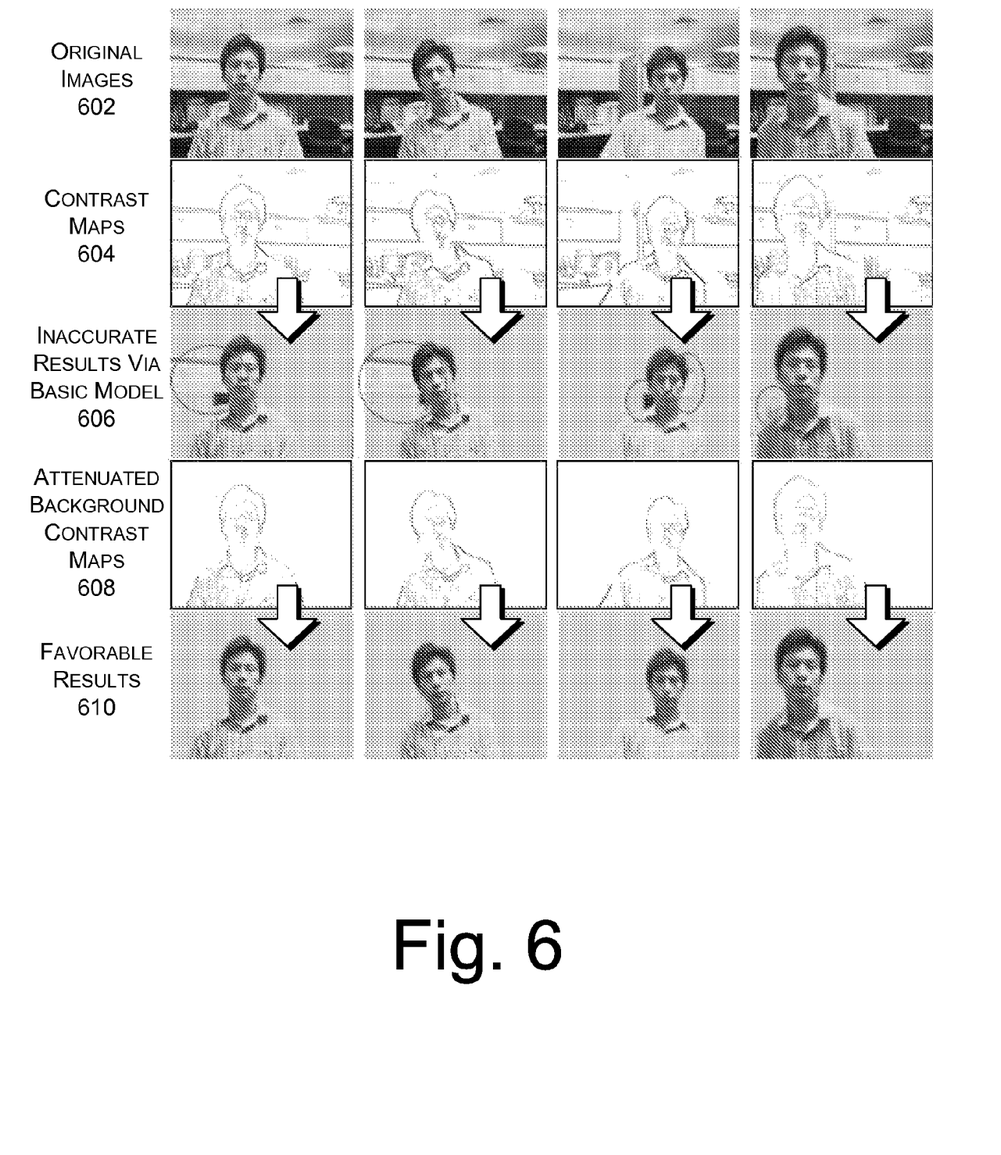
FIG. 6 is a diagram of exemplary improved segmentation results based on attenuated background in a contrast map.

FIG. 4 also shows a contrast map 410 after the background contrast attenuator 220 adaptively applies Equation (10). As illustrated, most contrasts in the background 411 are greatly attenuated and most contrasts along the foreground object boundary 413 are well preserved. Segmentation result 412 is the corresponding image with the background removed. The last two rows 608 and 610 of FIG. 6 also show the attenuated contrast maps and favorable segmentation results.

Figure 7:
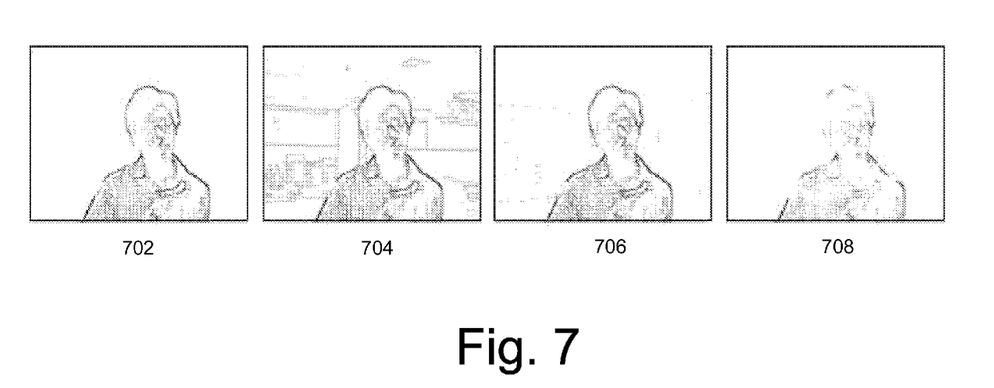
FIG. 7 is a diagram of exemplary contrast maps resulting from use of different values of a background contrast attenuation parameter.

FIG. 7 shows attenuation results using different values for parameters K and $z_{rs}$. Contrast map 704 shows that a large K will decrease the attenuation strength. A small $z_{rs}$ will leave more contrasts in the image (such as in contrast map 706) and vise versa (as in contrast map 708). In one implementation, the default values of K and $z_{rs}$ are set to 5 and 10 respectively to obtain good segmentation results on average, as shown in contrast map 702. These values are quite stable—there is no notable change in segmentation results when K and $z_{rs}$ are changed within the ranges (2.5-10) and (5-20) respectively.

The adaptive background contrast attenuator 220 works very well in most cases if there is no sizable illuminance change in the background image. In order to make the background contrast attenuation more robust, a measure of $z_{rs}$ is used that is not sensitive to large illuminance change:

$$z_{rs} = |\vec{v}(I_r, I_s) - \vec{v}(I_r^B, I_s^B)|, \tag{12}$$

where $\vec{v}(a,b)$ is a vector from point a to point b in RGB color space, as shown in FIG. 5(b). The measure $z_{rs}$ is illuminance-invariant if the color changes of two adjacent pixels are assumed to be the same (as also shown in FIG. 5(b)).

Background Maintenance

A challenge in real-life video scenarios is background maintenance. Many conventional techniques have been proposed to handle various changes in the background, e.g., gradual and sudden illuminance change (light switch in an office being turned on and off), small moving objects in the background (e.g., a moving curtain), casual camera shaking (e.g., a web cam on a laptop computer), sleeping object (an object that moves into the background and then becomes motionless), walking object (an object that moves away from the background and reveals new parts of the background), and shadows cast by the foreground object. The adaptive background maintenance engine 204 makes exemplary systems more practical and robust to background changes by using an adaptive mixture model.

In one implementation, the adaptive background maintenance engine 204 uses an adaptive mixture of global 226 and per-pixel 224 background color models. For the color term—of the "basic model"—or of models that have both color and contrast terms—there is a tradeoff between the global background color model 226 (which is more robust to background change) and the per-pixel background color model 224 (which is more accurate). A mixing factor in models such as the basic model is typically a fixed value. To maximize robustness, an improved system such as the exemplary video layer extraction engine 110 adaptively adjusts a similar mixing factor. Thus, if the foreground colors and background colors can be well separated, the adaptive background maintenance engine 204 relies more on the global color model 226 such that the whole system is robust to various changes of background. Otherwise, the engine 110 relies on both the global 226 and per-pixel 224 color models.

In one implementation, to achieve this goal, the adaptive background maintenance engine 204 adaptively mixes the two models based on the discriminative capabilities of the global background color model 226 and the per-pixel background color mixture model 224. In one implementation, the adaptive background maintenance engine 204 adopts an approximation of the Kullback-Liebler divergence between two Gaussian Mixture Models (GMMs), as in Equation (13):

$$KL_{fb} = \sum_{k=0}^{K} w_k^f \min_i \left( KL(N_k^f \| N_i^b) + \log \frac{w_k^f}{w_i^b} \right), \quad (13)$$

where $N_k^f$ and $N_i^b$ are the kth component of foreground GMMs and the ith component of background GMMs respectively. The KL-divergence between $N_k^f$ and $N_i^b$ can be computed analytically. In one implementation, the adaptive mixture for the background color model 224 is given in Equations (14) and (15):

$$p'_{mix}(I_r) = \alpha' p(I_r | x = 0) + (1 - \alpha') p_B(I_r) \quad (14)$$

$$\alpha' = 1 - \frac{1}{2} \exp(-KL_{fb}/\sigma_{KL}), \quad (15)$$

where $\sigma_{KL}$ is a parameter to control the influence of $KL_{fb}$. If the foreground and background color can be well separated, i.e., $KL_{fb}$ is large, the adaptive background maintenance engine 204 sets the mixing factor α' to be large to rely more on the global background color model 226. Otherwise, the adaptive background maintenance engine 204 sets the mixing factor α' to be small (e.g., minimum value is 0.5) in order to use both the global 226 and per-pixel 224 background color models.

Exemplary Background Maintenance Schema

Because visual communications (e.g., video chat) usually last only for a short duration, sudden illuminance change is a main issue to be considered, e.g., due to auto-gain/white-balance control of the camera, illumination by fluorescent lamps (asynchronous with frame capture in the camera), and light switching. In addition, there are also several possible background change events, i.e., small movement in the background, casual camera shaking, "sleeping" and "walking" objects in the background. The following is one implementation of an exemplary background maintenance schema based on the above-described adaptive mixture of global 226 and per-pixel 224 background color models.

Sudden Illumination Change

Change in illuminance caused by auto-gain/white-balance control of a camera or illumination by a fluorescent lamp is usually a small global change. In one implementation, a histogram specification is adopted to adjust the background image globally. After segmentation at each timestep, the adaptive background maintenance engine 204 computes a histogram transformation function between two histograms from labeled background regions in I and $I^B$. Then the adaptive background maintenance engine 204 applies this transformation to update the whole background image $I^B$. This simple exemplary method works well for small global illuminance or color changes.

In one implementation, the adaptive background maintenance engine 204 detects relatively large sudden illuminance changes (e.g., caused by light switching) using frame differences. If the difference is above a predefined threshold, the engine 204 triggers the following background maintenance processes.

Sudden illuminance change before segmentation: the background image $I^B$ is updated by histogram specification and the global background color model 226 is rebuilt. The foreground threshold $t_f$ is increased to $3_{t_f}$ to avoid introducing incorrect samples. A background uncertainty map $UB = \{u_r^B = 1\}$ is initialized. The mixture for the background color model 226 is modified as in Equation (16):

$$p'_{mix}(I_r | x=0) = \alpha' p(I_r | x=0) + (1-u_r^B) \cdot (1-\alpha') p_B(I_r). \quad (16)$$

Sudden illuminance change after segmentation: the adaptive background maintenance engine 204 updates the color, variance, and uncertainty of each pixel in the labeled background region as in Equations (17), (18), and (19):

$$I_{r,t}^B = (1-\rho) I_{r,t}^B + \rho I_{r,t} \quad (17)$$

$$\sigma_{r,t}^2 = (1-\rho) \sigma_{r,t}^2 + \rho (I_{r,t} - I_{r,t}^B)^T (I_{r,t} - I_{r,t}^B) \quad (18)$$

$$u_r^B = (1-\rho) u_r^B + \rho (1 - \exp(-\|I_{r,t} - I_{r,t}^B\|/2\sigma_{r,t}^{-2})), \quad (19)$$

where $\rho = \beta N(I_{r,t} | I_{r,t}^B, \sigma_{r,t}^2)$ and $\beta$ (e.g., typically 0.2) is the learning rate. The uncertainty of the hidden pixel behind the foreground is not decreased because there is no information about it.

Movement in the Background

In one implementation, the adaptive background maintenance engine 204 handles moving backgrounds via two mechanisms. First, if the foreground colors and background colors can be well separated, the adaptive background maintenance engine 204 automatically self-adjusts to rely on the global background color model 226, which is robust to small movements or dynamic motions (e.g., a moving curtain) in background. Second, if there is no intersection between a moving object and the foreground, the adaptive background maintenance engine 204 keeps the largest connected component in the segmentation result as a foreground object. Otherwise, the adaptive background maintenance engine 204 treats the moving object as foreground if there is no higher-level semantic information available. If this treatment is incorrect, however, the adaptive background maintenance engine 204 immediately recovers as soon as the object moves out of view or does not interact with the foreground.

Sleeping and Walking Objects

Both cases, sleeping and walking, are essentially similar: a sleeping object is a new static object in the background and a walking object reveals new background areas. The adaptive background maintenance engine 204 absorbs these new pixels into background when they do not intersect with the foreground. After segmentation, small connected-components that are far from the foreground (i.e., the largest connected component) are identified as new pixels. If these pixels and their neighboring pixels are labeled as background for a sufficient time period, then in one implementation the adaptive background maintenance engine 204 triggers background maintenance processing (i.e., Equations (17), (18), and (19)) to absorb these pixels into the background.

Casual Camera Shaking

Camera shaking often occurs for laptop users. In one implementation, the adaptive background maintenance engine 204 detects camera translation between the current and previous frames. If the translation is small (e.g., less than four pixels) then a Gaussian blurred (e.g., standard variance 2.0) background image is applied and the weight of the per-pixel color model 224 is decreased because the global background color model 226 is insensitive to camera shaking. If the translation is large, then the adaptive background maintenance engine 204 may disable the per-pixel color model 224.

Background Substitution

Optionally, after the foreground and background layers are determined by the segmentation engine 208 and boundary determination engine 212, the background substitution engine 206 may combine one or other of the layers with new or different layers. In one implementation, the substitute background input 228 receives or buffers a substitute background image, which the video layer merge engine 230 combines with the extracted foreground, to place the foreground object (e.g., the image of the user) in a new or modified background in real time. Since the background image is stationary in one implementation of the exemplary video layer extraction engine 110, the new background to be substituted can just be a still image of a scene or environment.

Exemplary Methods

Figure 8:
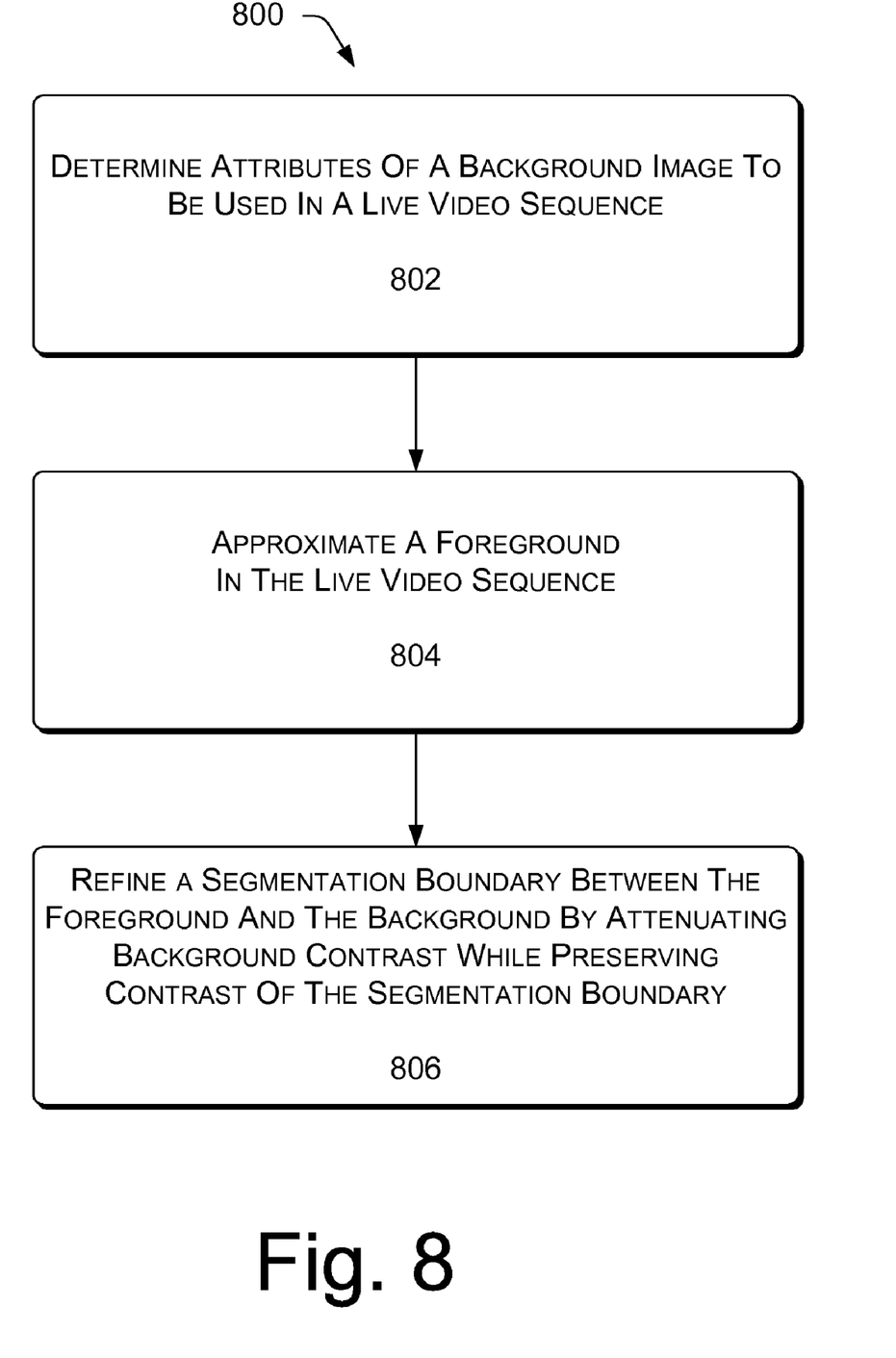
FIG. 8 is a flow diagram of an exemplary method of refining a segmentation boundary based on an attenuated background contrast.

FIG. 8 shows an exemplary method 800 of refining a segmentation boundary based on an attenuated background contrast. In the flow diagram, the operations are summarized in individual blocks. Depending on implementation, the exemplary method 800 may be performed by hardware, software, or combinations of hardware, software, firmware, etc., for example, by components of the exemplary video layer extraction engine 110.

At block 802, attributes of a background image to be used in a live video sequence are determined.

At block 804, a foreground in the live video sequence is approximated using both color and contrast cues.

At block 806, a segmentation boundary between the foreground and the background is refined by attenuating background contrast while preserving contrast of the segmentation boundary.

Figure 9:
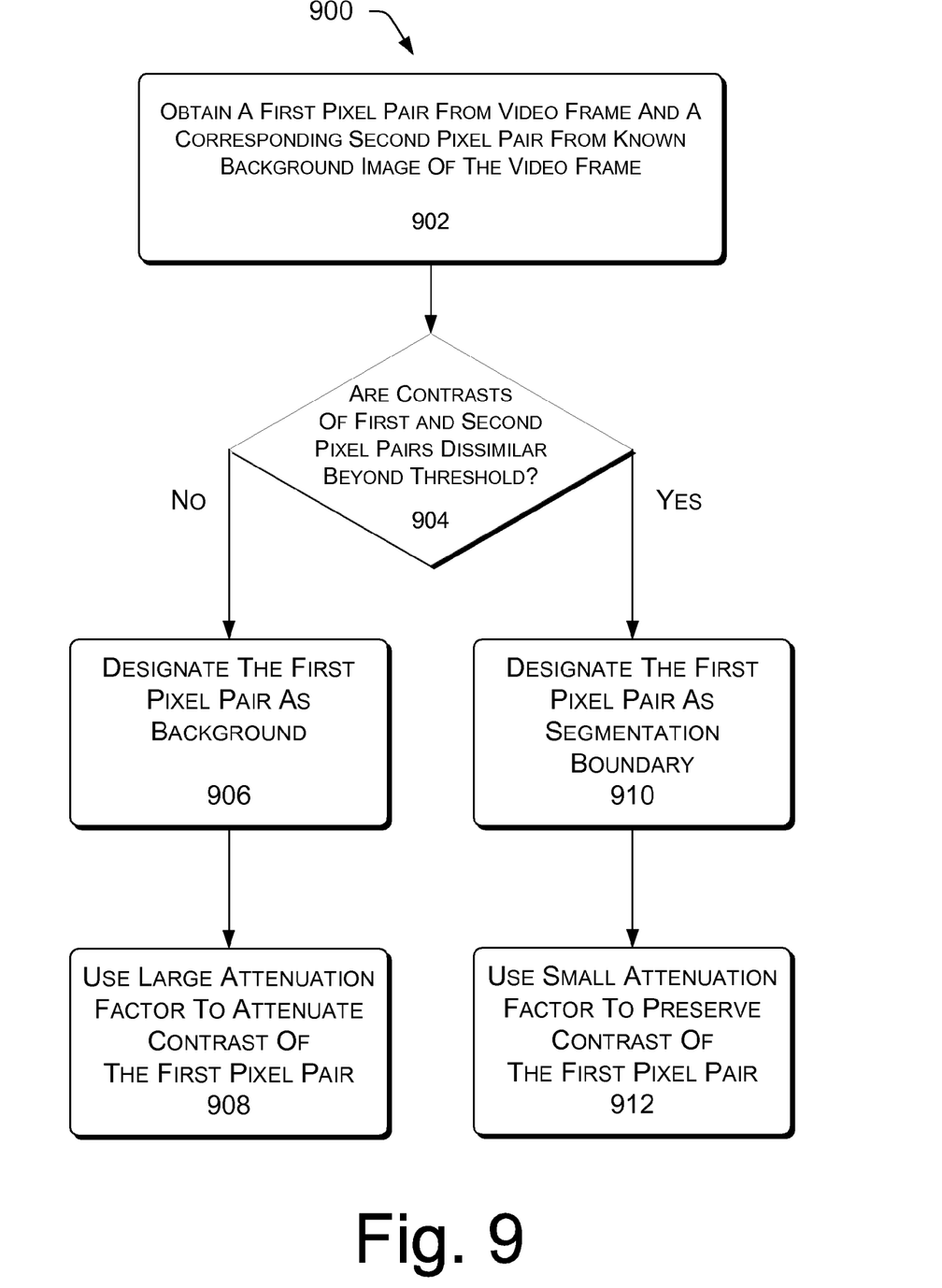
FIG. 9 is a flow diagram of an exemplary method of comparing pixel pairs between a video frame and a known background to refine a segmentation boundary by attenuating contrasts in the background.

FIG. 9 shows an exemplary method 900 of comparing pixel pairs between a video frame and a known background to refine a segmentation boundary by attenuating contrasts in the background. In the flow diagram, the operations are summarized in individual blocks. Depending on implementation, the exemplary method 900 may be performed by hardware, software, or combinations of hardware, software, firmware, etc., for example, by components of the exemplary video layer extraction engine 110.

At block 902, a first pixel pair is obtained from a video frame and a corresponding second pixel pair is obtained from a known background image used in the video frame. The video frame is from a live video sequence. The first pixel pair is from the current live video sequence itself while the second pixel pair is from a known background image used as a background setting for the live video sequence.

At block 904, contrasts of the first and second pixel pairs are compared to determine if they are dissimilar from each other beyond a threshold. Since contrast is a difference between an attribute of each pixel in a pair or group of pixels, the attribute may be illuminance, color intensity, grayscale, etc.

At block 906, if the first and second pixel pairs are not dissimilar from each other beyond a threshold, then the first pixel pair from the video frame is designated as being in the background. That is, if the pixel pair from the video sequence has the same value of a contrast attribute as its corresponding pixel pair in the known background, then the pixel pair from the video sequence is considered to be part of the background.

At block 908, the first pixel pair, now designated as background, is subjected to a large attenuation factor to decrease the contrast of the pixel pair. Thus, the contrasts of the pixel pairs in the background are attenuated, i.e., the background edges are reduces in intensity or disappear in a contrast map, leaving only a highly conspicuous segmentation border that provides accurate segmentation.

At block 910, if the contrasts of the first and second pixel pairs were dissimilar beyond a threshold, then the first pixel pair from the video frame is designated as being on or associated with the segmentation boundary between foreground and background.

At block 912, the contrast of the first pixel pair from the video frame is preserved by either not attenuating the contrast of the first pixel pair or by using a small attenuation factor to attenuate the contrast of the first pixel pair. This leaves the segmentation border as a strong edge for producing accurate segmentation.

Figure 10:
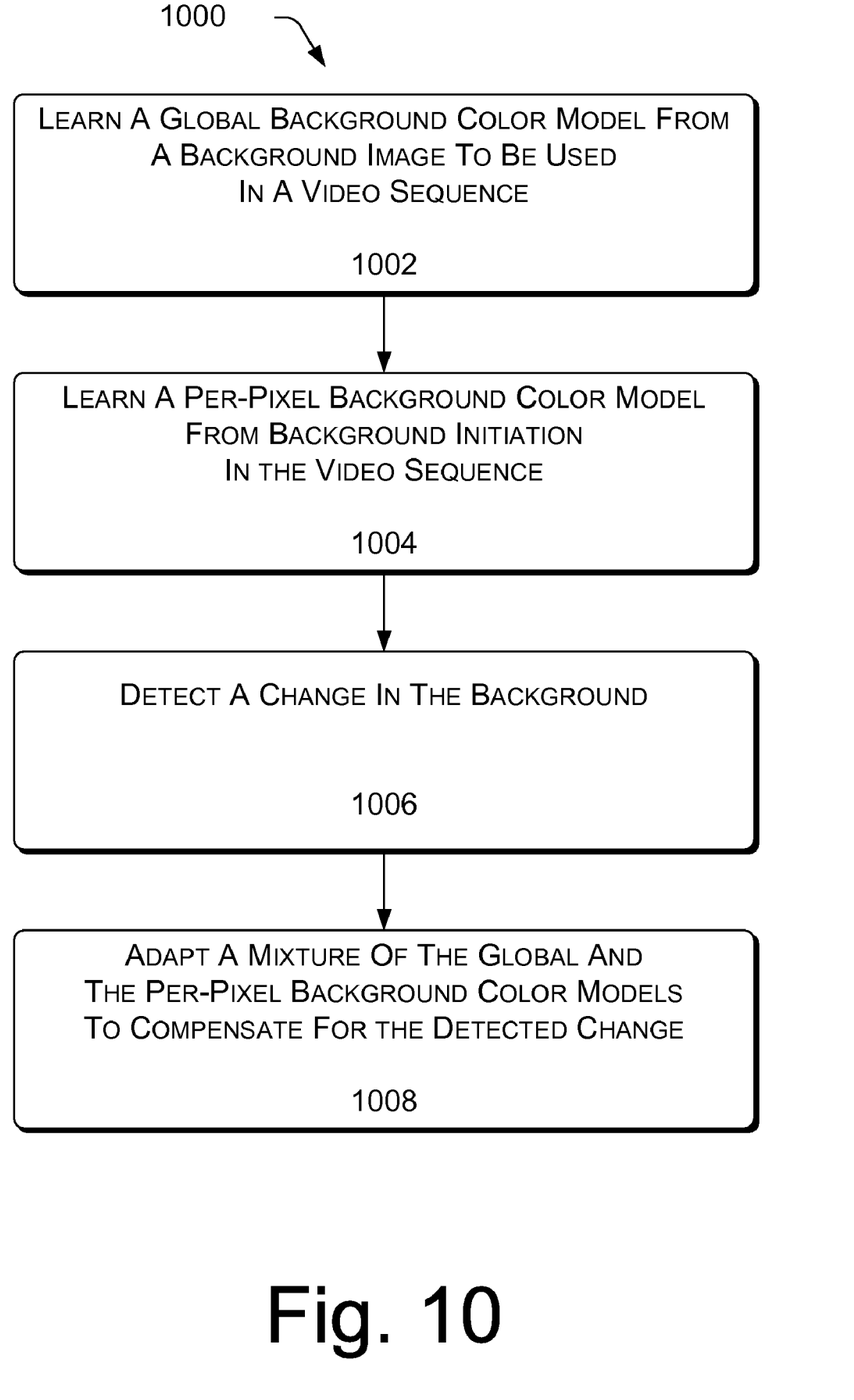
FIG. 10 is a flow diagram of an exemplary method of using an adaptive background color mixture model to maintain a background in a video sequence.

FIG. 10 shows an exemplary method 1000 of using an adaptive background color mixture model to maintain a background in a video sequence. In the flow diagram, the operations are summarized in individual blocks. Depending on implementation, the exemplary method 1000 may be performed by hardware, software, or combinations of hardware, software, firmware, etc., for example, by components of the exemplary video layer extraction engine 110.

At block 1002, a global background color model is learned from a background image to be used in a video sequence. That is, the global color palette that characterizes the background is learned. To maintain the background in the face of a minor background change, the affected part of the video frame can be reverted to the global background color model.

At block 1004, a per-pixel background color model is learned from initiation of the background in the video sequence. The per-pixel color model is more precise than the global color model but is sensitive to noise, illumination changes, and small movement in the background.

At block 1006, a change is detected in the background during live running of the video sequence. The change may be due to camera shaking, a shift in illumination, a small object moving into the background or passing through the background, or a shadow cast by the foreground.

At block 1008, a mixture of the global and the per-pixel background color models is adapted to compensate for the detected change. The ratio of the mixture depends on the type of background change. The global background color model is generally more robust to background change. The per-pixel background color model, however, is more accurate than the global model.

Conclusion

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method of segmenting a foreground from a background image, comprising:
    hardware for determining color and contrast attributes of pixels of the background image to be used in a video sequence, wherein the background image occupies an entire area of each frame of the video sequence except when the foreground hides part of the background image;
    hardware for approximating a segmentation boundary demarcating the foreground based on differences between color and contrast attributes of pixels of the foreground versus the color and contrast attributes of pixels of the background image; and
    hardware for refining the segmentation boundary between the foreground and the background image by adaptively attenuating a background contrast, wherein the attenuating includes decreasing a value of the contrast attribute of pixel pairs in the background image while maintaining a value of the contrast attribute of pixel pairs associated with the segmentation boundary.

2. The method as recited in claim 1, wherein the refining associates a pixel pair with the segmentation boundary when a value of the contrast attribute of the pixel pair is dissimilar to a value of the contrast attribute of a corresponding pixel pair in the background image.

3. The method as recited in claim 1, wherein the background image is stationary through the video sequence.

4. The method as recited in claim 1, further comprising obtaining the video sequence from a single camera.

5. The method as recited in claim 1, wherein the contrast attributes of pixels of the foreground and background image comprise a color image gradient.

6. The method as recited in claim 1, further comprising segmenting the foreground from the background image at the segmentation boundary.

7. The method as recited in claim 6, further comprising merging the foreground with a different background image.

8. The method as recited in claim 1, further comprising applying an adaptive mixture model to improve segmenting the foreground from the background image under various background changes.

9. The method as recited in claim 8, further including maintaining the background image during the video sequence, wherein the maintaining includes compensating for a change in the background image during the video sequence by adaptively applying a weighted mixture of a per-pixel background color model and a global background color model.

10. The method as recited in claim 9, further comprising learning the global background color model from the background image.

11. The method as recited in claim 9, further comprising learning a per-pixel variance of the per-pixel background color model from a background initiation phase.

12. The method as recited in claim 9, further comprising weighting the mixture of the per-pixel background color model and the global background color model according to the type of the change in the background image.

13. The method as recited in claim 9, wherein the type of change in the background image comprises one of: noise, illuminance change, small movement of the background due to camera motion, a small object moving across the background, and a small object entering the background and coming to rest in the background.

14. A system for segmenting a foreground from a background of a video sequence, comprising:
    hardware comprising a foreground extractor to separate the foreground from the background of the video sequence, the foregoing extractor comprising:
        a segmentation engine to label pixels of the video sequence as either foreground or background;
        a boundary determination engine to calculate a boundary between the foreground and the background;
        a color evaluator to calculate the boundary according to foreground colors and background colors; and
        a contrast evaluator to calculate the boundary according to foreground contrasts and background contrasts, the contrast evaluator comprises a background contrast attenuator to attenuate contrast in the background while adaptively preserving contrast associated with the boundary.

15. The system as recited in claim 14, further comprising a background image manager to obtain and track color and contrast attributes of an image to be used as the background of the video sequence.

16. The system as recited in claim 14, further comprising a single camera to obtain the video sequence.

17. The system as recited in claim 14, further comprising a background maintenance engine to compensate for a change in the background image during the video sequence by adaptively applying a weighted mixture of a per-pixel background color model and a global background color model.

18. The system as recited in claim 17, wherein the background maintenance engine learns the global background color model from the background and the background maintenance engine learns the per-pixel background color model from a background initiation.

19. The system as recited in claim 14, further comprising a background substitution engine to merge a different background with the separated foreground in the video sequence.

20. A computer-implemented system for segmenting a foreground from a background image, comprising:
    hardware means for segmenting the foreground from the background image in a video sequence;

hardware means for determining a segmentation boundary between the foreground and the background image;

hardware means for selecting pixel pairs associated with the segmentation boundary according to a difference in contrast with corresponding pixel pairs in the background image; and hardware means for refining the segmentation boundary by attenuating background contrast while preserving contrast of the pixel pairs associated with the segmentation boundary.

* * * * *